(12) United States Patent
Piratla et al.

(10) Patent No.: US 9,342,532 B2
(45) Date of Patent: May 17, 2016

(54) SYSTEM AND METHOD FOR REAL-TIME MAP-BASED LOST AND FOUND

(75) Inventors: Nischal Piratla, Fremont, CA (US); Angela Nicoara, Los Altos, CA (US)

(73) Assignee: DEUTSCHE TELEKOM AG, Bonn (DE)

(*) Notice: Subject to any disclaimer, the term of this patent is extended or adjusted under 35 U.S.C. 154(b) by 1698 days.

(21) Appl. No.: 12/556,159

(22) Filed: Sep. 9, 2009

(65) Prior Publication Data
US 2011/0061018 A1 Mar. 10, 2011

(51) Int. Cl.
*G06F 17/30* (2006.01)
*G01C 21/36* (2006.01)

(52) U.S. Cl.
CPC ........ *G06F 17/30241* (2013.01); *G01C 21/367* (2013.01); *G01C 21/3679* (2013.01)

(58) Field of Classification Search
CPC ............ G06F 17/30241; G01C 21/367; G01C 21/3679
USPC ....................................................... 715/781
See application file for complete search history.

(56) References Cited

U.S. PATENT DOCUMENTS

| | | | |
|---|---|---|---|
| 5,180,192 A | 1/1993 | Herbert | |
| 5,299,116 A | 3/1994 | Owens et al. | |
| 5,878,116 A | 3/1999 | Scott | |
| 5,932,859 A | 8/1999 | Ijichi et al. | |
| 6,259,367 B1 | 7/2001 | Klein | |
| 6,624,752 B2 | 9/2003 | Klitsgaard et al. | |
| 7,606,580 B2* | 10/2009 | Granito et al. | 455/456.1 |
| 2003/0229452 A1* | 12/2003 | Lewis | G06Q 50/24 702/19 |
| 2006/0055538 A1 | 3/2006 | Ritter | |
| 2007/0203644 A1* | 8/2007 | Thota et al. | 701/211 |
| 2008/0046511 A1* | 2/2008 | Skrenta | 709/204 |
| 2008/0104531 A1* | 5/2008 | Stambaugh | 715/771 |
| 2008/0113674 A1* | 5/2008 | Baig | G06Q 10/10 455/456.3 |
| 2009/0117926 A1* | 5/2009 | Sterlino | 455/466 |
| 2009/0292464 A1* | 11/2009 | Fuchs et al. | 701/208 |
| 2010/0046553 A1* | 2/2010 | Daigle | G06F 21/35 370/474 |
| 2015/0370829 A1* | 12/2015 | Achlioptas | G06F 17/30041 707/722 |

* cited by examiner

*Primary Examiner* — Alvin Tan
(74) *Attorney, Agent, or Firm* — Leydig, Voit & Mayer, Ltd.

(57) ABSTRACT

A system and method for lost and found includes enabling information about found objects to be stored in real time. The method further includes enabling adjustment of a field of view of an interactive map. The method further includes receiving a search input for search of a lost object. The method further includes performing a search for the lost object based on at least the stored information about the found objects, the search input, and the field of view of the interactive map. The method further includes enabling results of the search to be overlaid on the interactive map.

9 Claims, 11 Drawing Sheets

SYSTEM AND METHOD FOR REAL-TIME MAP-BASED LOST AND FOUND

TECHNICAL FIELD

The present invention relates generally to lost & found, and in particular but not exclusively, to an apparatus, method, system, and manufacture for a global, real-time map-based lost and found service accessible via a web-based interface and/or by mobile devices.

BACKGROUND

Today, lost and found operations are run at a fixed place within a facility where things are lost and found. Few examples include a school campus, a library, a recreation park, and an office facility. Additional lost and found operations are also run by public security offices such as police stations, etc.

There are popular web forums too where people post the found items. A person who lost a particular object may contact the finder through email, and/or a phone number, if listed.

There are also lost & found technologies implemented based on what could be termed as preventive technologies. An object is tagged prior to its transport (e.g., airline baggage) so that it is easier to locate, if lost during the move.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, certain embodiments of the invention are related to a system and method for lost and found that includes enabling information about found objects to be stored in real time. The method further includes enabling adjustment of a field of view of an interactive map. The method further includes receiving a search input for search of a lost object. The method further includes performing a search for the lost object based on at least the stored information about the found objects, the search input, and the field of view of the interactive map. The method further includes enabling results of the search to be overlaid on the interactive map.

Illustrative Operating Environment

Figure 1:
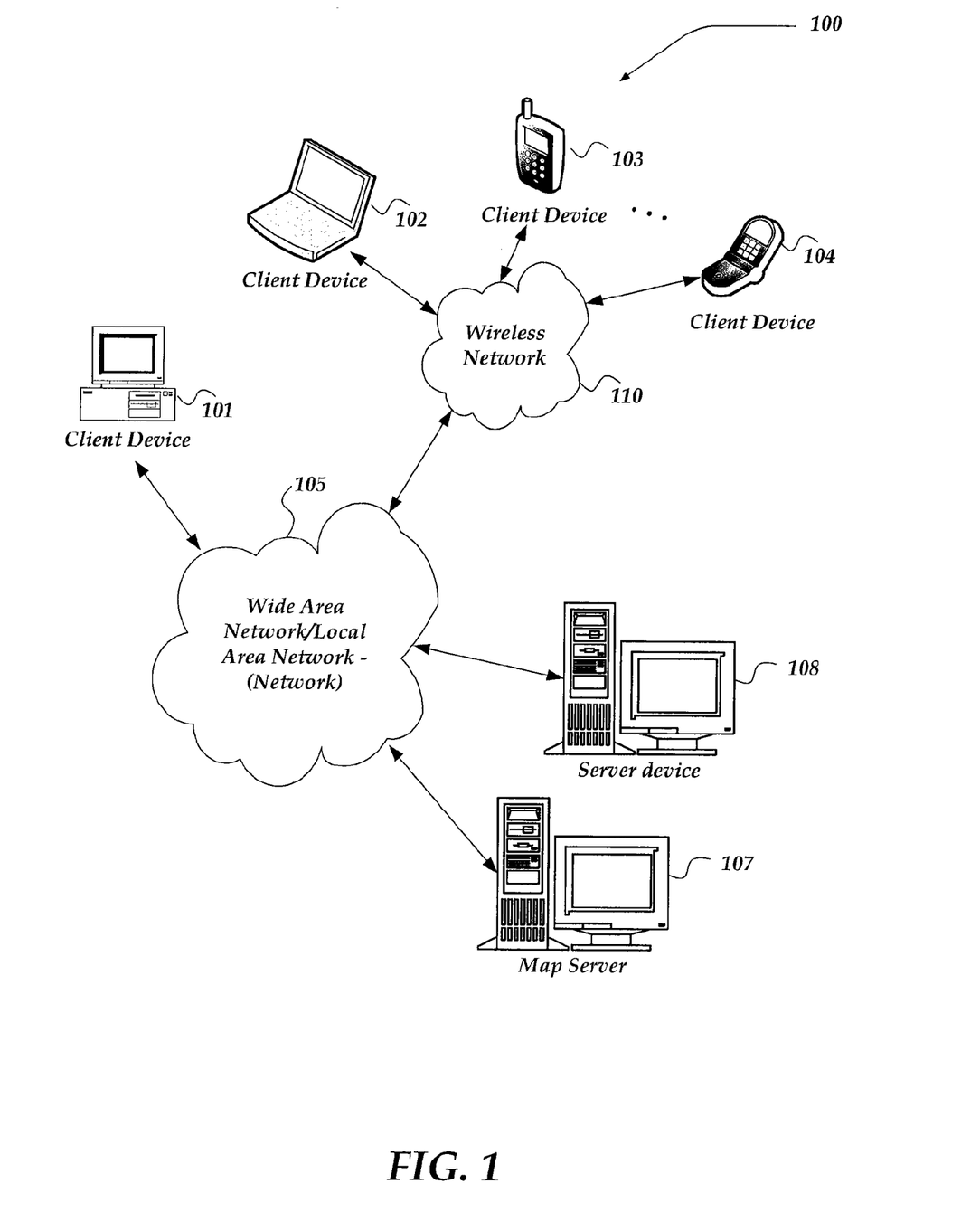
FIG. 1 shows a block diagram of an embodiment of a system for communicating over a network.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, service device 108, and nap server 107.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

In one embodiment, client devices 101-104 may further provide information useable to detect a location of the client device. Such information may be provided in a message, or sent as a separate message to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device. Information provided either as part of a user account generation, a purchase, or other activity may result in providing various customer profile information. Such customer profile information may include, but is not limited to demographic information about a customer, and/or behavioral information about a customer and/or activities. In one embodiment, such customer profile information might be obtained through interactions of the customer with a brick-and-mortar service, or dynamically tracked based on a usage of the telecommunication carrier's products/services. However, customer profile information might also be obtained by monitoring activities such as purchase activities, network usage activities, or the like, over a network.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple server device 108, map server 107, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Server device 108 is a network computing device that is configured to provide perform a map-based global lost and found function as described in detail below. Map server 107 is a network device that performs map functions. The map functions performed by server device 108 are performed in communication with map server 107.

Devices that may operate as server device 108 include, but are not limited to personal computers, desktop computers, multiprocessor systems, microprocessor-based or programmable consumer electronics, network PCs, servers, network appliances, and the like.

Although server device 108 is illustrated as a distinct network device, the invention is not so limited. For example, a plurality of network devices may be configured to perform the operational aspects of server device 108.

Map server 107 is a network computing device that is configured to perform global interactive map functions, and may include a map server of Google maps, Yahoo maps, or the like.

Illustrative Client Environment

Figure 2:
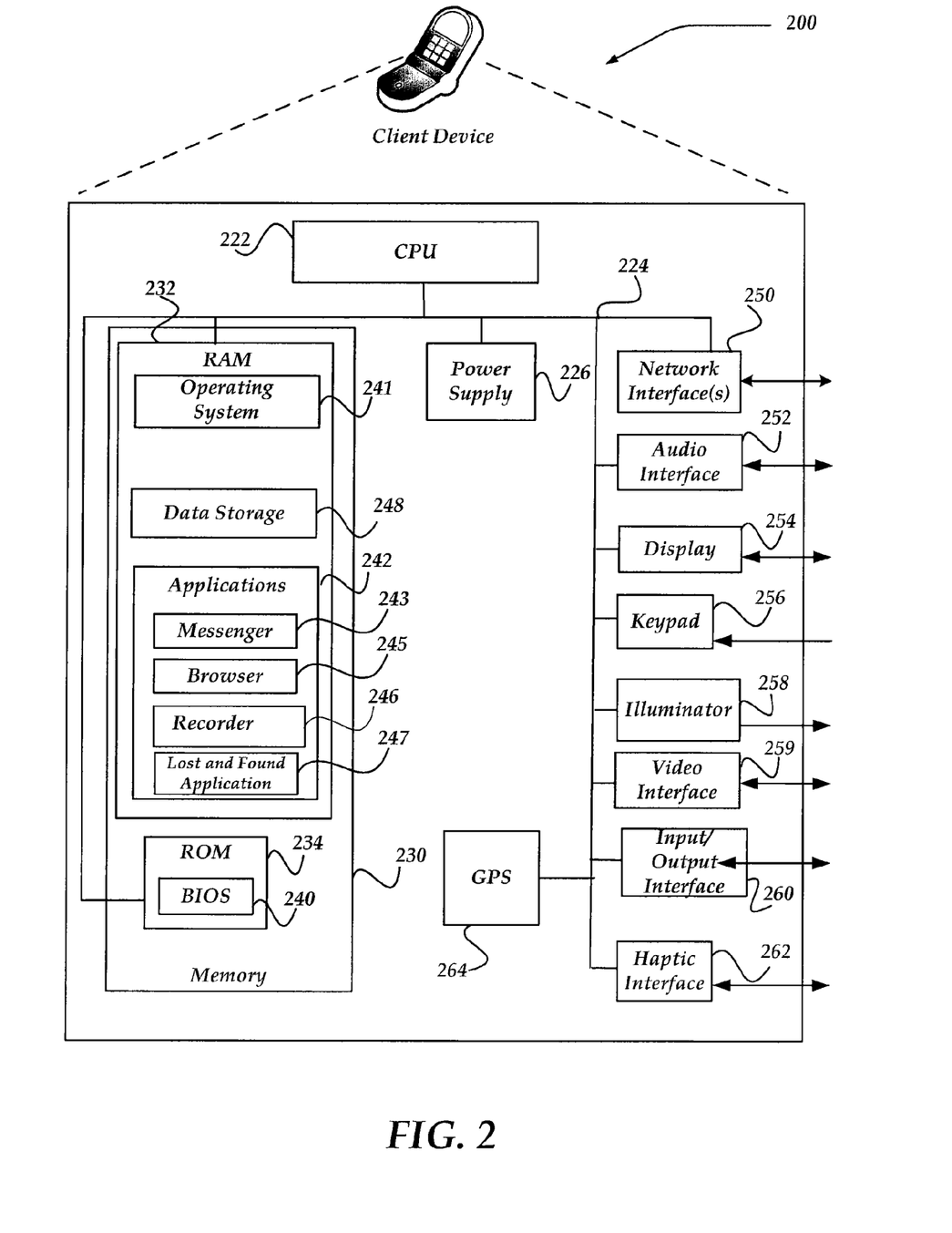
FIG. 2 illustrates a block diagram of an embodiment of a client device of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light. In one embodiment, video interface 259 may interact with recorder 246 application to manage such actions.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols.

Applications 242 may include lost and found application 237. In some embodiments, for mobile devices, lost and found application 237 is a mobile device application, and from a PC the lost and found application is a web-based application that is accessed using browser 245 to communicate with the lost and found service over the internet.

Illustrative Network Device Environment

Figure 3:
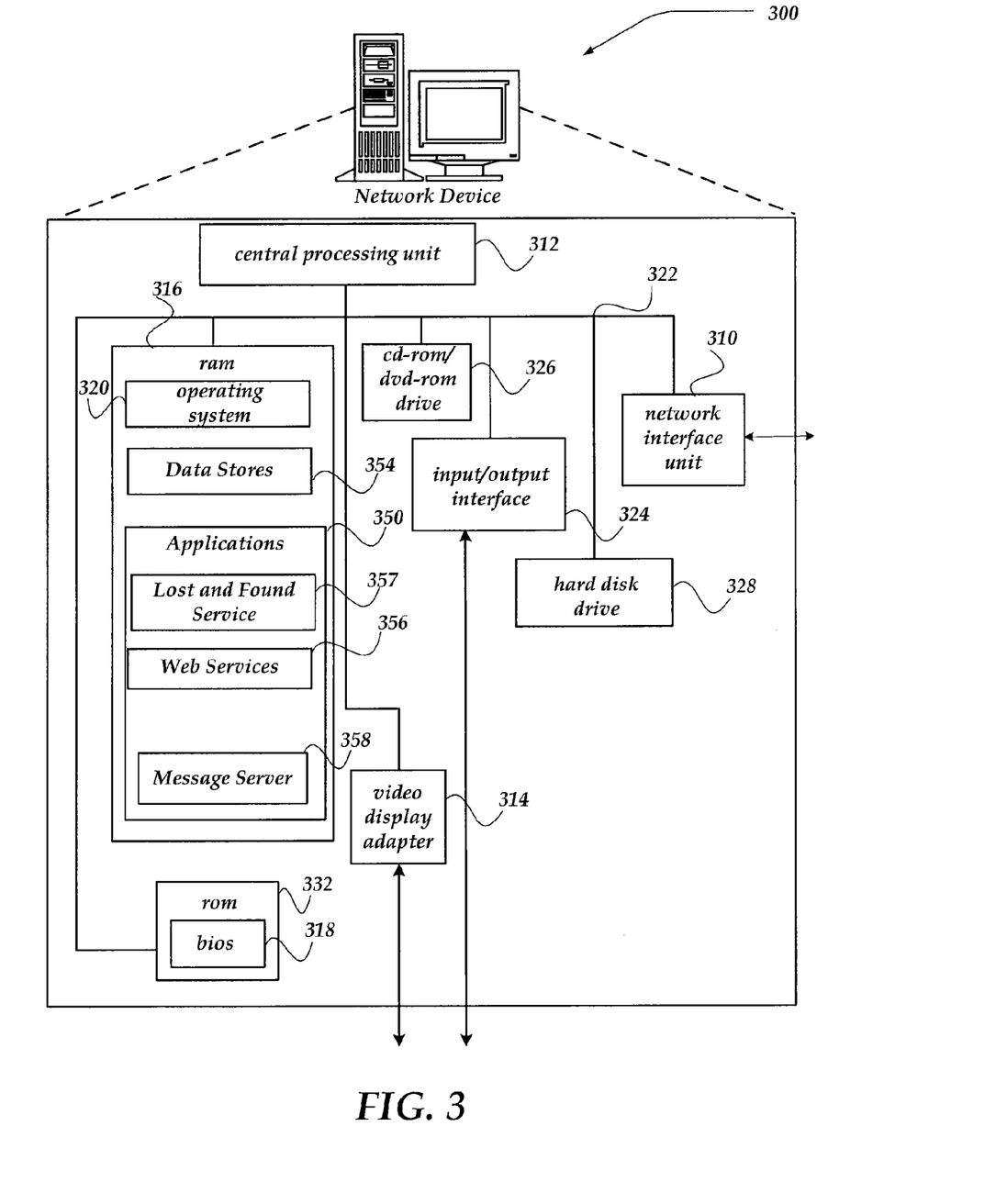
FIG. 3 shows a block diagram an embodiment of a network device of FIG. 1.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, server device 108 of FIG. 1.

Network device 300 includes processing unit 312, video display adapter 314, input/output interface 324, and a mass memory, all in communication with each other via bus 322. The mass memory generally includes RAM 316, ROM 332, and one or more permanent mass storage devices, such as hard disk drive 328, tape drive, optical drive 326, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may include virtually any mechanism usable for store and managing data, including but not limited to a file, a folder, a document, or an application, such as a database, spreadsheet, or the like. Data store 354 may manage information that might include, but is not limited to web pages, information about members to a social networking activity, contact lists, identifiers, profile information, tags, labels, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and lost and found service 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

One embodiment of lost and found service 357 is described further below in conjunction with FIG. 4.

Illustrative Processes

Figure 4:
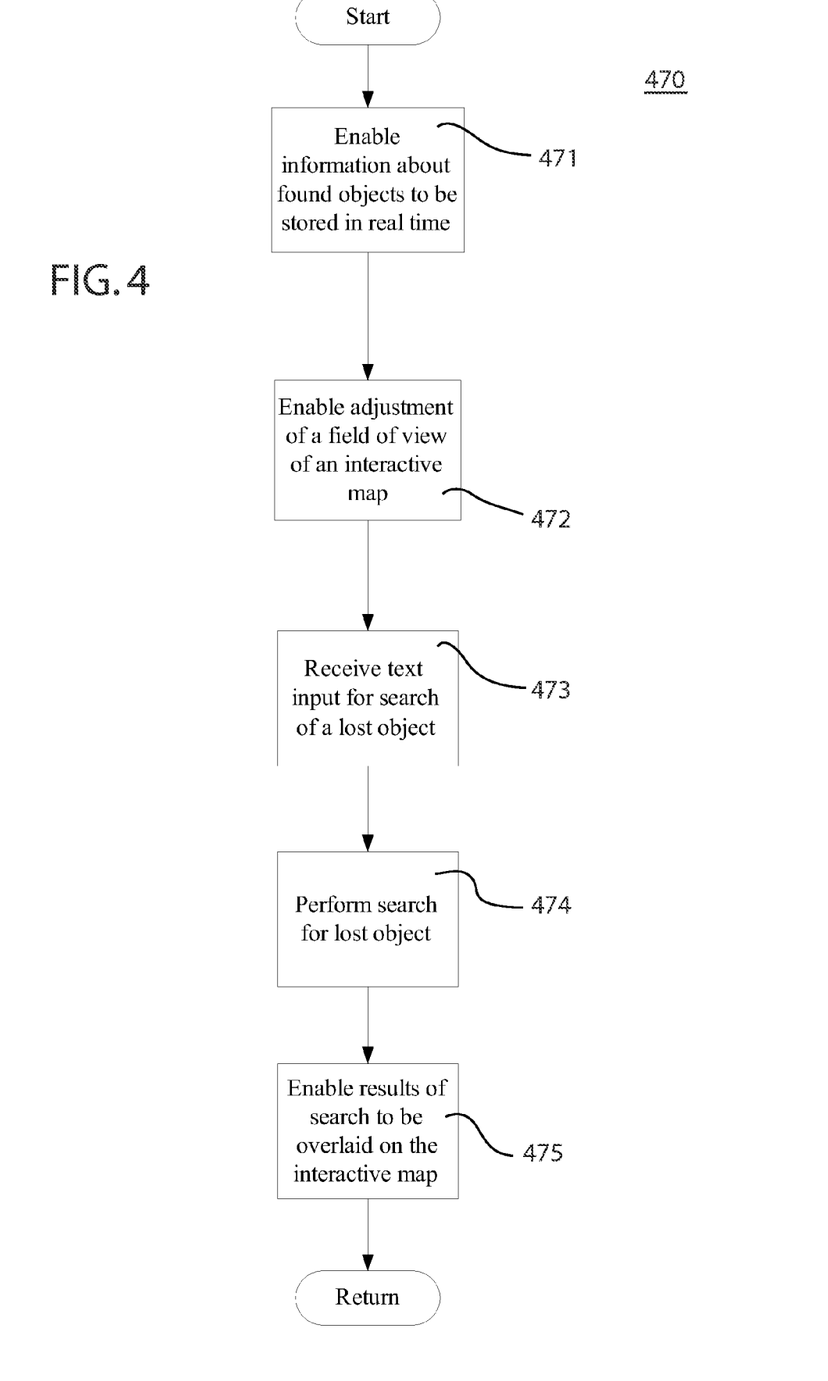
FIG. 4 illustrates a block diagram of an embodiment of a process of a found object search.

FIG. 4 illustrates a block diagram of an embodiment of a process (470) of a found object search. After a start block, the process proceeds to block 471, wherein the storing of information about found objects in real time is enabled. One embodiment of the process performed at block 471 is explained in further detail below with regard to FIG. 7.

The process then moves to block 472, where adjustment of a field of view of an interactive map is enabled. For example, in some embodiments, server device 108 of FIG. 1 communicates with map server 107 to generate an interactive map and provides the interactive map to client devices (e.g. 101-104 of FIG. 1). The client device may display the interactive map as a backdrop for the lost and found application, and the interactive map may include controls for adjusting the field of view of the interactive map. The field of view of the interactive map may be adjustable in several ways, such as changing the center point of the map by panning or the like, zooming in, and zooming out. The map may also allow a user to enter a particular location, and if the location is found, changing the field of view to the particular location. In some embodiments, the interactive map is a global interactive map. The interactive map may be provided by the use of the Google map API, or the like.

The process then advances to block 473, where search input for search of a lost object is received. For example, in some embodiments, the interactive map displayed on the client device based on communication with the server device may have a text entry field which is fillable by the client device. When the client device enters text in this field, it may be transmitted to the server device, which receives the search input. The search input may be a text input, a voice input, or the like. If the input is a voice input or some other type of input other than a text input, it may be converted into a text input, which is received at block 473.

The process then moves to block 474, where a search is performed for the lost object based on at least the stored information about the found objects, the search input, and the field of view of the interactive map. For example, in some embodiments, the search is based on the area or field of view currently displayed on the interactive map, and the search is for found object entries based on the search input. For example, a search for "bag" may search for found entries in the area containing the word bag or a form of the word bag, and may also search for synonyms or related words to "bag" such as sack, pouch, backpack, and/or the like. Techniques used in search engines may be used to find items likely relevant to a search for "bag" that do not actually contain the word "bag". If more than a particular number of hits are found in the area, the particular number of hits displayed, is based on relevance. Also, rather than searching for the exact field of view on the screen, a search area related to the field of view may be used. For example, in the search, in addition to providing a text input, the client device may further specify a search radius. The search area may be the center of the current field of view of the map, in the radius specified in the search.

The process then proceeds to block 475, where overlaying the results of the search on the interactive map is enabled. In one embodiment, the map includes bubbles at the location of hits for the search, with the search results displayed to the left of the map corresponding to each bubble. In other embodiments, the overlay of the search results onto the map may be accomplished in other ways.

The process then moves to a return block, where other processing is resumed.

The steps discussed in FIG. 4 may be performed by a server device, in communication with a client device. For example, the client device may contain a lost and found application. The client device may use the lost and found application to display the interactive map based on communication with the server device, adjust the field of view of the interactive map based on communication with the server device, communicating the search input for search of a lost object to the server device, receiving results of a search for the lost object from the server device, and overlay the results of the search on the interactive map based on communication with the server device.

In some embodiments, additional fields may be used for the search. For example, in some embodiments, the found item records may include time and date fields, and the search may further allow time and date of finding the objects to be included as search terms. For example, this can be used to allow a lost object search to be made only on or after the date and/or time that the object was lost, to further narrow down the search.

Figure 11:
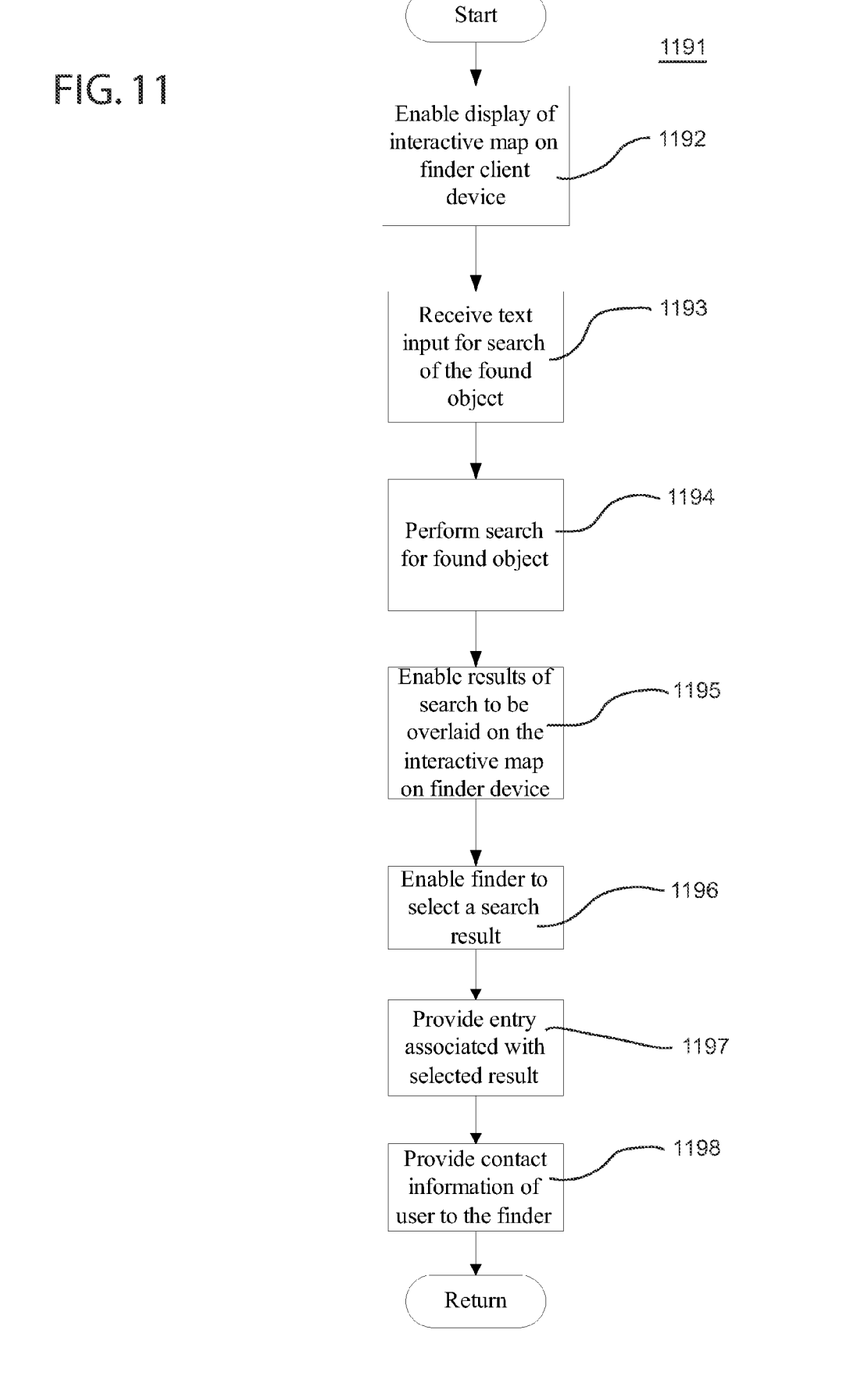
FIG. 11 shows a flow chart of an embodiment of a process for a lost object search, in accordance with aspects of the present invention.

FIG. 4 discusses an interactive map for searching for found items, and FIG. 11 discusses an interactive map for searching for lost items. However, in some embodiments, the two types of search may both be accessed from the same map, and a search may even be performed for both lost and founds items simultaneously.

Figure 5:
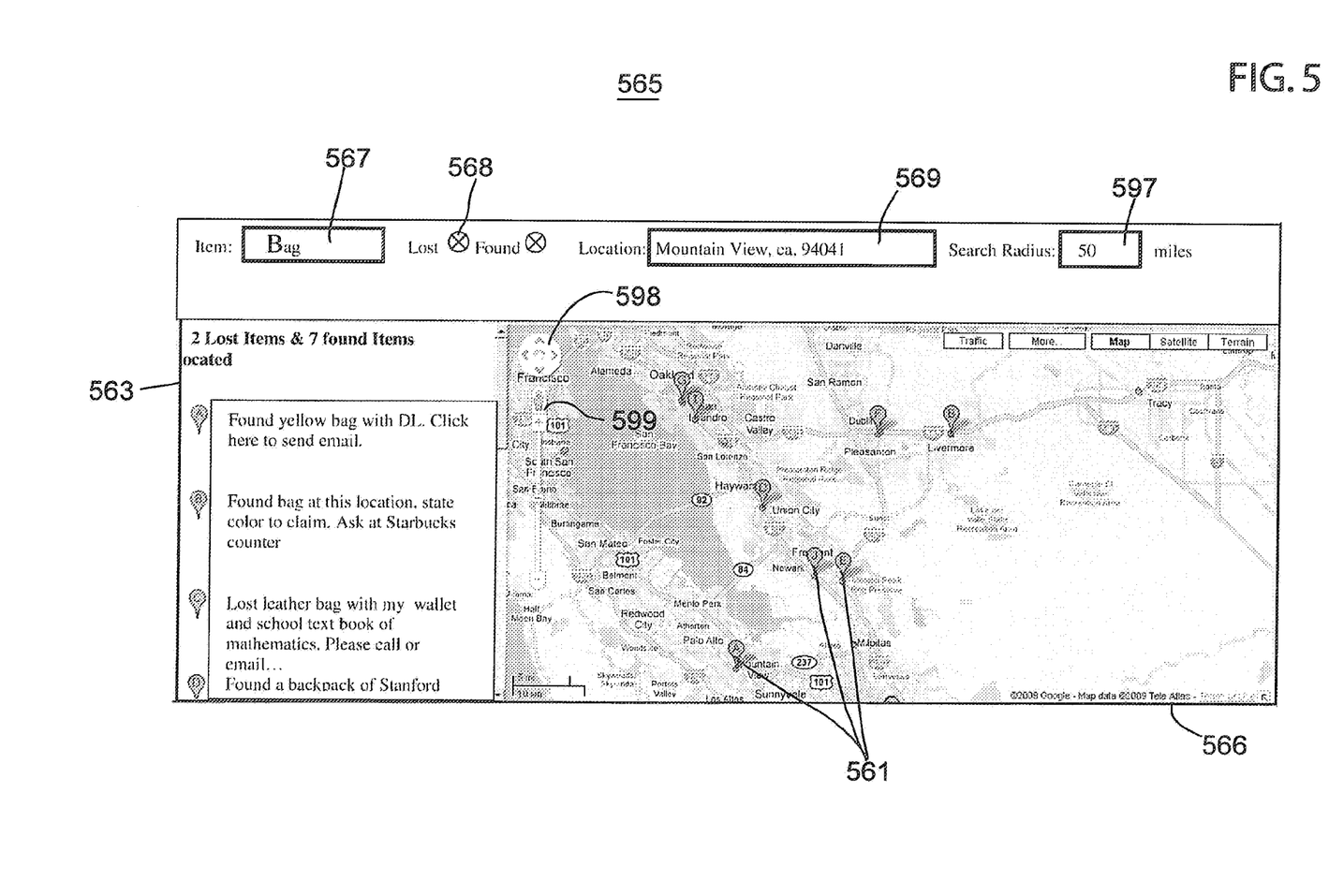
FIG. 5 shows an embodiment of an interactive map that may be used in the process illustrated in FIG. 4.

FIG. 5 shows an embodiment of an interactive map (565) that may be used in the process 470 of FIG. 4. Interactive map 565 includes text entry field 567, check boxes 568, location field 569, search radius field 597, graphical map portion 566, map panning control 598, zoom control 599, bubbles 561, and search results descriptions 563.

Location field 569 is used to center the field of view for the graphical map portion 566, either as part of a search or prior to a search. Text entry field 567 is used to enter the text for searching for lost and/or found items. For example, if a bag was lost or found, "bag" may be entered into text entry field 567, as illustrated in FIG. 5. Checkboxes 568 may be used to indicate whether the search is for lost items, found items, or both. Search radius field 597 is used to enter the radius for the search. Search results are shown as bubbles 561 at the corresponding locations on the graphical map portion 566, and as descriptions 563. Zoom control 599 may be employed to zoom in and on. Map panning control 598 may be employed to pan the map. In some embodiments, instead of or in additional to map panning control 598, a mouse and/or the like may be used for panning the map.

Figure 6:
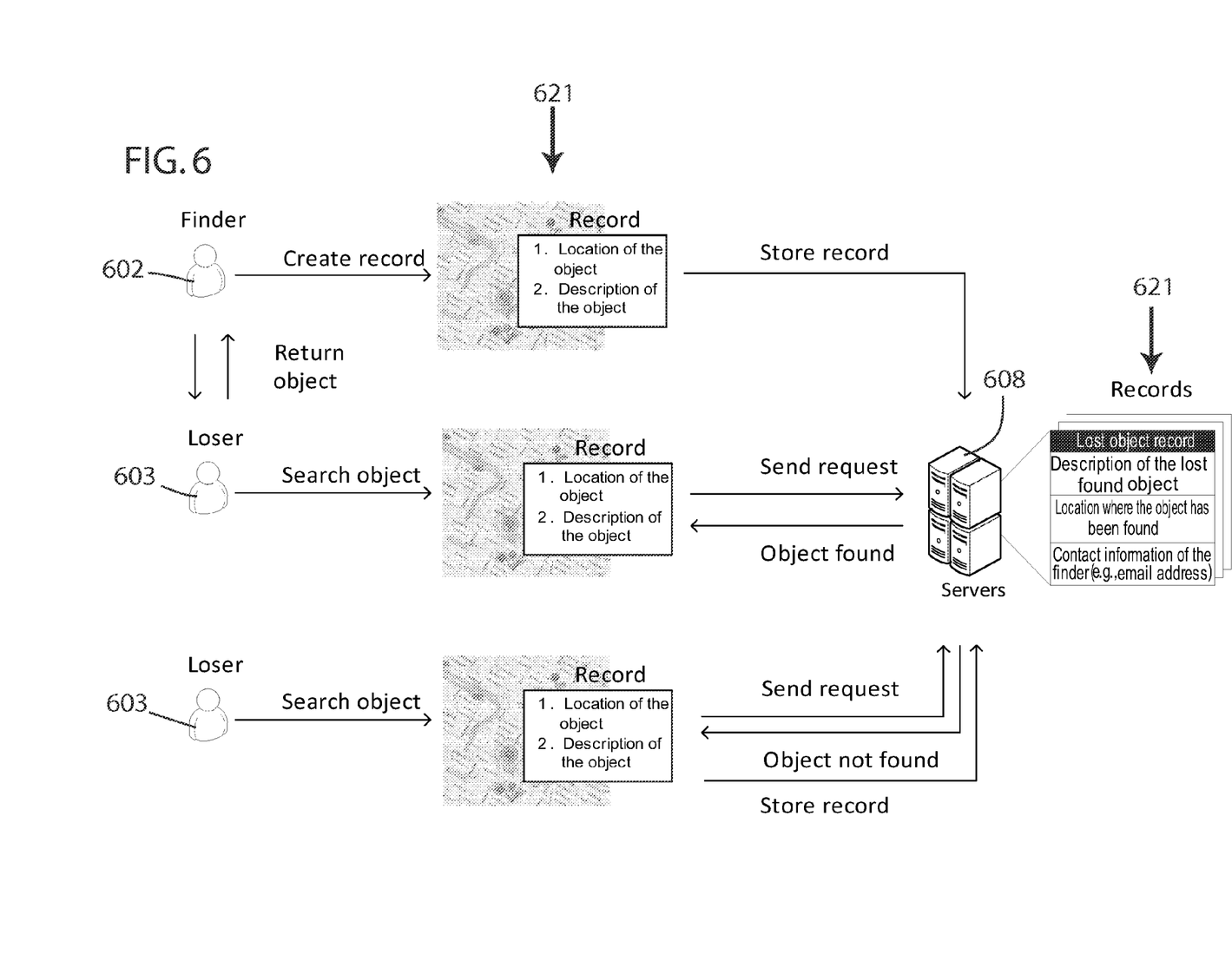
FIG. 6 illustrates a flow chart of an embodiment of the system of FIG. 1.

FIG. 6 illustrates a flow chart of an embodiment of system 600, which is an embodiment of system 100 of FIG. 1. System 600 includes finder 602, loser 603, records 621, and servers 608.

If a finder 602 finds an object T at a certain location L, finder 602 may access the lost and found application (e.g., lost and found application 247 of FIG. 2), and initiate a "found" operation, as discussed in greater detail with regard to FIG. 7 below. The finder 602 may create a record 621 for a found object, which is restored in servers 608 or in a database that is in communication with servers 608.

A loser 603, who has lost an object Q at and around the location L, or if L was one of the places that loser passed by, then he/she enters the lost and found application either through mobile or PC and searches the posting along the route he/she traveled. In some embodiments, entering the lost and found application is a web-based application that communicates with servers 608 via the World Wide Web. Loser 602 sends a request, and a search is made among the stored records 621 of found items. This search, which is map-based, may be performed as illustrated in FIG. 4 and discussed in greater detail above. As discussed in greater detail below with regard to FIG. 8, the object may either be found or not.

Figure 9:
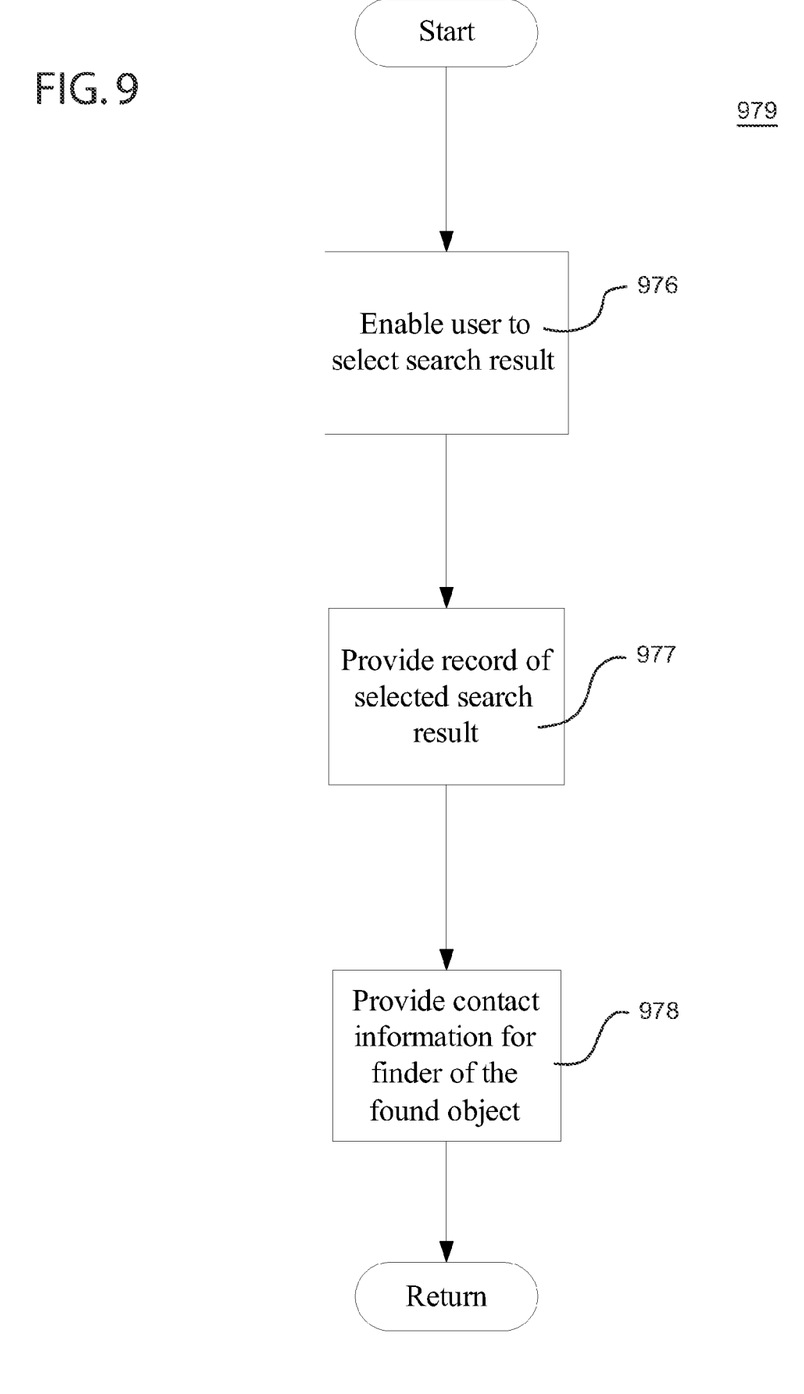
FIG. 9 shows a flow chart of an embodiment of a process for a loser accessing a found object record.

After the search, a particular result may be selected, and the loser 603 may obtain the contact information of finder 602, as explained in further detail in FIG. 9 in one embodiment. After loser 603 obtains the contact information of finder 602, the process illustrated in FIG. 10 may be performed so that the object may be returned if it is verified that the object belongs to loser 603.

In another scenario, loser 603 checks with the lost and found application 237 to determine if anyone has reported an item as lost similar to item T, before posting it. If loser 603 posts the description of the lost item Q into the system, along with possible route/location, even before finder 602 finds it then finder 602 can contact loser, without making his/her own entry of object T. An example of a map-based search that may be performed by finder 602 to find lost objects is explained in greater detail below with regard to FIG. 11.

A center is not required to collect the objects found and/or return them; however such centers globally run by an operator of the above mentioned service could still be run in conjunction with the lost and found service.

The system and method described allows the lost and found to be performed in real time. For example, a finder of the lost object can report the found object immediately using the lost and found service on a mobile device, with the information available on the lost and found service immediately, so that someone who lost the object can use a search to find the object immediately by doing a search on a mobile, so that the object could be found within the system in a very short time, such as a few minutes, after losing it. The real-time lost and found service also operates on a global scale in some embodiments.

Figure 7:
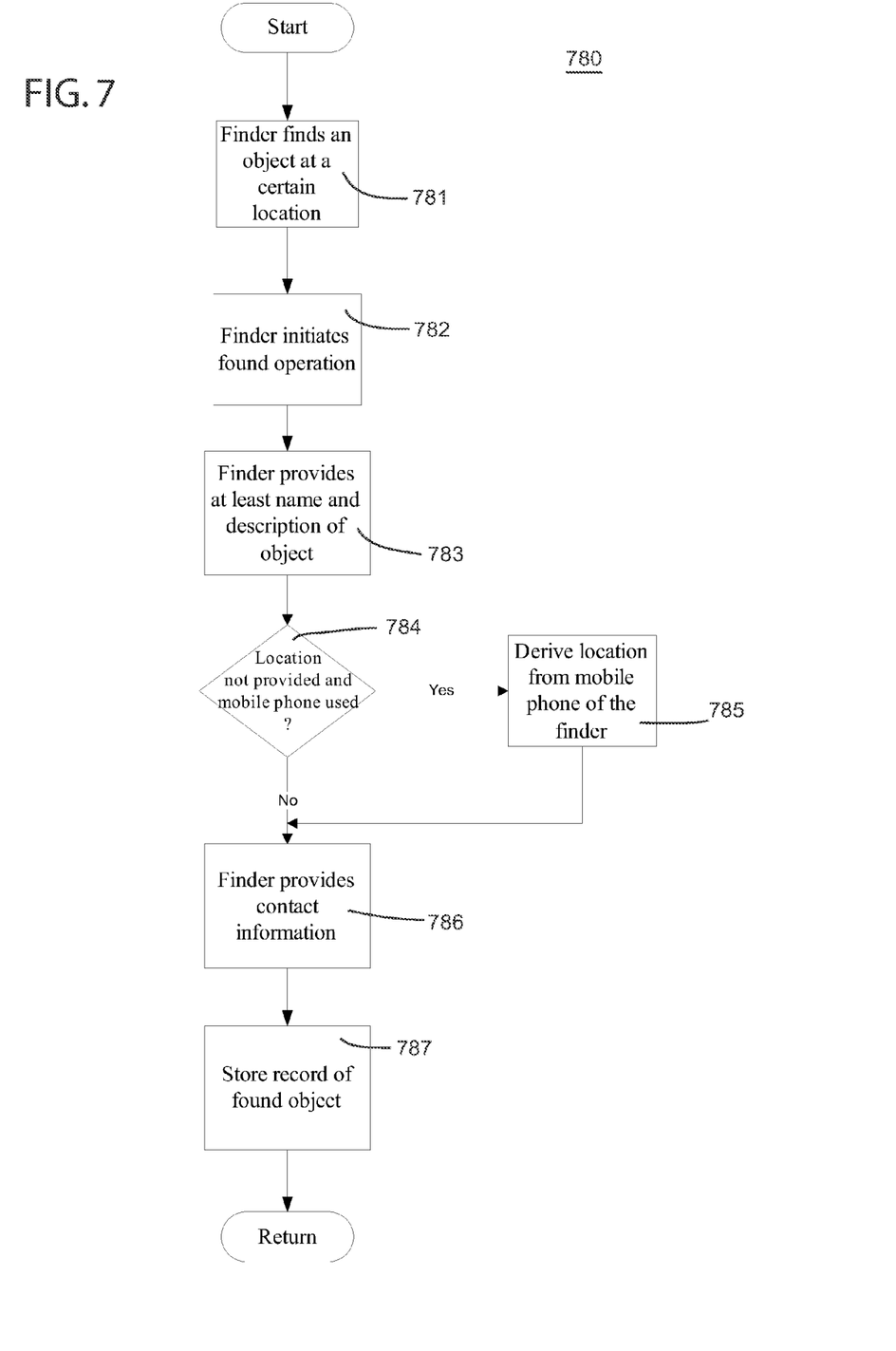
FIG. 7 shows a flow chart of an embodiment of a process for creating a found object record.

FIG. 7 shows a flow chart of an embodiment of a process (780) for creating a found object record. After a start block, the process proceeds to block 781, where a finder finds an object at a certain location. The process then moves to block 782, where the finder initiates a found operation, for example by accessing a lost and found application on a client device (which may be a mobile device, PC, or the like), which communicates with a server device.

The process then advances to block 783, where the finder provides at least the item name and description of the object. In some embodiments, the item name and description are separate fields. In other embodiments, there are not separate item name and description fields, only a description field. In this case, the finder provides at least the description of the object at block 793. The finder may also provide the location of the object. If the client device is not equipped with GPS or the like, the finder provides the location at block 783.

For example, in some embodiments, there may be an item name field, which could be filled with "bag" in one record, a location field which indicates the exact location, and a description field that reads, "Found bag at this location, state color to claim. Ask at Starbucks counter." The actual item name field is used in the search. The description field contains information useful to individuals who lost a similar object, but may contain information that would not be useful in the actual search, so in some embodiments only the item name and not the description is used in the search. In other embodiments, the description is also used in the search, and in other embodiments, there is a description field but not an item name field.

In some embodiments, time and date fields may also be provided, either by the finder based on the time that the object was found, or the time that the founder reported the object found may be used. These fields may also be used for lost object records in some embodiments.

The process then proceeds to decision block 784, where a decision is made as to whether the location is provided and whether a mobile phone (or other device equipped with a GPS) is used. If the finder is accessing the lost and found service from a mobile phone, and the finder did not provide an address, the process moves to block 785, where the location of the mobile phone of the finder is derived and used as the location. The process then proceeds to block 786.

However, at decision block 784, if the location is provided, or a mobile phone was not used, the process advances to block 786, where the finder provides contact information (e.g., email, phone number, or the like). In some embodiments, contact information is not provided, and this step is skipped. For example, as shown in FIG. 5, one of the descriptions reads, "Found bag at this location, state color to claim. Ask at Starbucks counter." In this example, the item was left at the Starbucks counter, and so the finder of the object did not need to leave his contact information. Of course, the contact information for the Starbucks at that location could be provided in this example, but need not be in some embodiments. The process then moves to block 787, where a record of the object is stored, including the description and location. The process then moves to a return block, where other processing is resumed.

Figure 8:
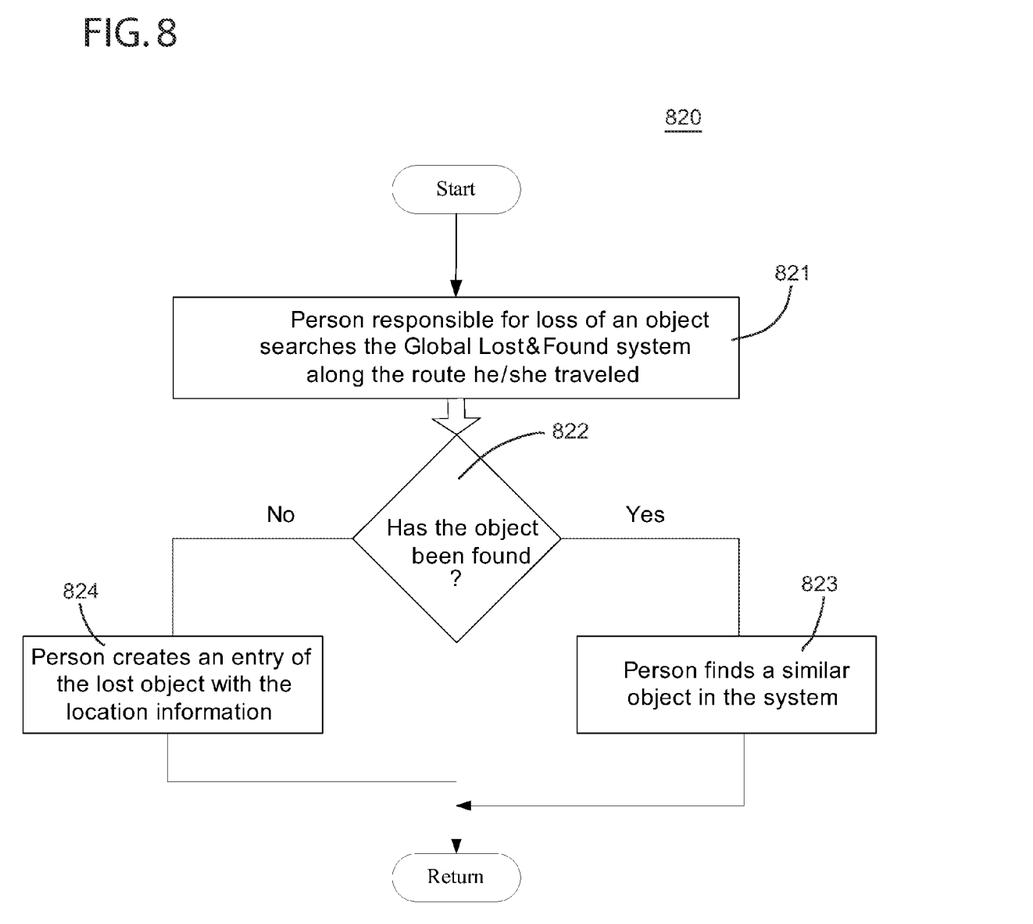
FIG. 8 illustrates a flow chart of an embodiment of a process for object search.

FIG. 8 illustrates a flow chart of an embodiment of a process (820) for object search. After a start block, the process proceeds to block 821, where the person responsible for the loss of an object searches the lost and found system along the route the person traveled, for example using the process described above with regard to FIG. 4. The process then advances to decision block 822, where a determination is made as to whether the object has been found. If the determination at decision block 822 is negative, the process moves to block 824, where the person creates an entry of the lost object with at least a description of the object and the location. If the person responsible for the object is using a mobile phone, the location may be derived from the mobile phone in a similar manner as discussed above with regard to FIG. 7. The process then proceeds to a return block, where other processing is resumed.

If the determination at decision block 822 is positive, the process proceeds to block 823, where the person finds a similar object in the system. The process then advances to the return block. In some embodiments, if the person found a similar object in the system at block 823, process 979 of FIG. 9 may be performed next.

FIG. 9 shows a flow chart of an embodiment of a process for a loser accessing a found object record. After a start block, the process proceeds to block 976, where selecting of a search result by a user is enabled (e.g., the search results found at block 474 of FIG. 4 and overlaid on the interactive map at block 475 of FIG. 4). For example, the selection may be made by clicking on one of the search results.

The process then moves to block 977, where the found object record of the selected search results is provided to the user. As discussed above, the found object record includes at least the description of the object and the location of the object. The process then advances to block 978, where the contact information of the finder of the found object is provided. In some embodiments, the contact information is masked. For example, in some embodiments, the lost and found system may provide email communication from the user to the finder without revealing the actual email address of the finder. The process then proceeds to a return block, where other processing is resumed. In some embodiment, the steps of process 1030 of FIG. 10 are performed next.

Figure 10:
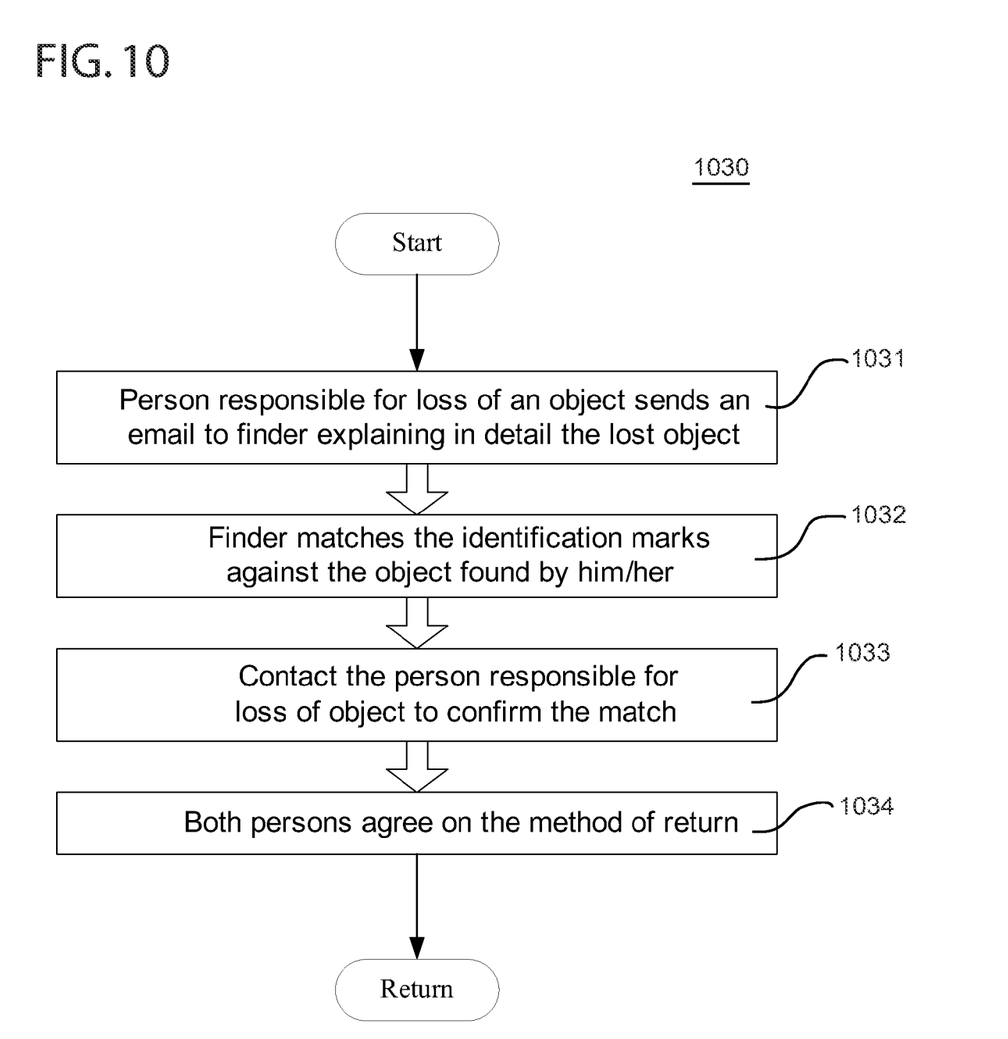
FIG. 10 illustrates a flow chart of an embodiment of a process for object return.

FIG. 10 illustrates a flow chart of an embodiment of a process (1030) for object return. After a start block, the process proceeds to block 1031, where the person responsible for the loss of an object sends an email to the finder explaining in detail the lost object. In some embodiments, the server device provides a masked email service to allow the person responsible for the loss of the object to send an email to the finder without learning the actual email address of the finder. In other embodiments, the person responsible for the loss of the object is given the actual email address of the finder (or other contact information, such as telephone number or the like). The process then moves to block 1032, where the finder matches the identification marks again the object found by the founder. The process then advances to block 1033, where the finder contacts the person responsible for the loss of the object to confirm the match. The process then proceeds to block 1034, where both persons agree on a method of return. The process then moves to a return block, where other processing is resumed.

In general, the server device does not perform method 1030; rather, this is the method suggested for the finder and person responsible for the loss to follow. In some embodiments, the server device may provide masked communication, as discussed previously, and may provide tips as to the recommended steps to perform for each party, but the actual actions takes by each individual is based on the discretion of the parties involved.

FIG. 11 shows a flow chart of an embodiment of a process (1191) for a lost object search. After a start block, the process proceeds to block 1192, where the display of an interactive map on a finder client device is enabled. The process then moves to block 1193, where a text input for search of the found objects among lost object records is performed. For example, in one embodiment, the map is interactive map 565 of FIG. 5, and the finder of an object checks the lost items box and not the found items box in the area where the object was found, and enters text associated with the found object in text entry field 567, to see whether the object found by the finder has been reported as lost within the lost and found service. The finder client device sends the text entered in text entry field 567 over the network to the server device, which receives the text input in step 1193.

The process then advances to block 1194, where a search is performed for the found object. The process then proceeds to block 1195, where display of overlaying the results of the search on the interactive map is enabled. The process then moves to block 1196, where selection of the search result by the finder is enabled. The process then advances to block 1197, where the finder is provided with an entry associated with the selected result. The process then proceeds to block 1198, where contact information of the user associated with the entry of the lost object is provided to the finder. In some embodiments, the contact information is masked. The process then moves to a return block, where other processing is resumed.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A manufacture including a tangible, non-transitory processor-readable medium having processor-executable code for matching users with lost and found objects stored thereon, the processor-executable code comprising processor-executable instructions for:
   storing information about objects in records, the records designating whether the objects were lost or found, locations at which the objects were lost or found, and, for each record designating an object as found, contact information for contacting the finder;
   displaying an interactive map, the interactive map having an area that allows a user to indicate whether to search for objects designated as lost, found or both;
   adjusting a field of view of the interactive map based on adjustment input from the user;
   receiving a search input for search of an object and a user indication to search for objects designated as found;
   performing a search for the object, the search being performed based on records designating objects as found, the search input, and the field of view of the interactive map;
   generating an overlay on the interactive map of objects that correspond to results of the performed search based on the information regarding the locations at which the corresponding objects were found;
   receiving a selection of an object from the results of the performed search by the user;
   providing the record of the selected object to the user, wherein the record includes a description of the selected object; and
   providing contact information for the finder of the selected object to the user.

2. The manufacture of claim 1, wherein the interactive map and the objects that correspond to the results of the performed search are displayed at a client device.

3. The manufacture of claim 1, wherein adjustment input received from the user includes at least one of:
   changing a center point of the field of view of the interactive map;
   zooming in; and
   zooming out.

4. The manufacture of claim 1, wherein information for a record designating an object as found is provided by the finder through a web-based interface or a mobile device; and
   wherein determining the location at which the object was found includes at least one of:
   receiving the location at which the object was found from the finder;
   deriving the location at which the object was found from the location of the mobile device.

5. A method for matching users with lost and found objects, comprising:
   storing information about objects in records in a database, the records designating whether the objects were lost or found, locations at which the objects were lost or found, and, for each record designating an object as found, contact information for contacting the finder;
   displaying an interactive map, the interactive map having an area that allows a user of a client device to indicate whether to search for objects designated as lost, found or both;
   adjusting a field of view of the interactive map based on adjustment input from the user of the client device;
   receiving a search input for search of an object from the user of the client device and a user indication to search for objects designated as found;
   performing a search for the object, the search being performed based on records designating objects as found, the search input, and the field of view of the interactive map;
   generating an overlay on the interactive map of objects that correspond to results of the performed search based on the information regarding the locations at which the corresponding objects were found;
   receiving a selection of an object from the results of the performed search by the user;
   providing the record of the selected object to the user, wherein the record includes a description of the selected object; and
   providing contact information for the finder of the selected object to the user.

6. The method of claim 5, wherein the overlay is displayed on the client device.

7. The method of claim 5, wherein adjustment input received from the user of the client device includes at least one of:
   changing a center point of the field of view of the interactive map;

zooming in; and zooming out.

8. The method of claim 5, wherein information for a record designating an object as found is provided by the finder through a web-based interface or a mobile device; and wherein determining the location at which the found object was found includes at least one of:

receiving the location at which the object was found from the finder;

deriving the location at which the object was found from the location of the mobile device.

9. A server device for matching users with lost and found objects, comprising:

a non-transitory memory that is arranged store processor-executable code; and a processor that is arranged to execute the processor-executable code to enable actions, comprising:

storing information about objects in records, the records designating whether the objects were lost or found, locations at which the objects were lost or found, and, for each record designating an object as found, contact information for contacting the finder;

displaying an interactive map, the interactive map having an area that allows a user to indicate whether to search for objects designated as lost, found or both;

adjusting a field of view of the interactive map based on adjustment input from the user;

receiving a search input for search of an object and a user indication to search for objects designated as found;

performing a search for the object, the search being performed based on records designating objects as found, the search input, and the field of view of the interactive map;

generating an overlay on the interactive map of objects that correspond to results of the performed search based on the information regarding the locations at which the corresponding objects were found;

receiving a selection of an object from the results of the performed search by the user;

providing the record of the selected object to the user, wherein the record includes a description of the selected object; and providing contact information for the finder of the selected object to the user.

\* \* \* \* \*